Dec. 28, 1965    J. W. DE LISLE NICHOLS ETAL    3,226,195
TESTING FOR THE PRESENCE OR ABSENCE OF A REAGENT IN LIQUORS
Filed Aug. 1, 1961
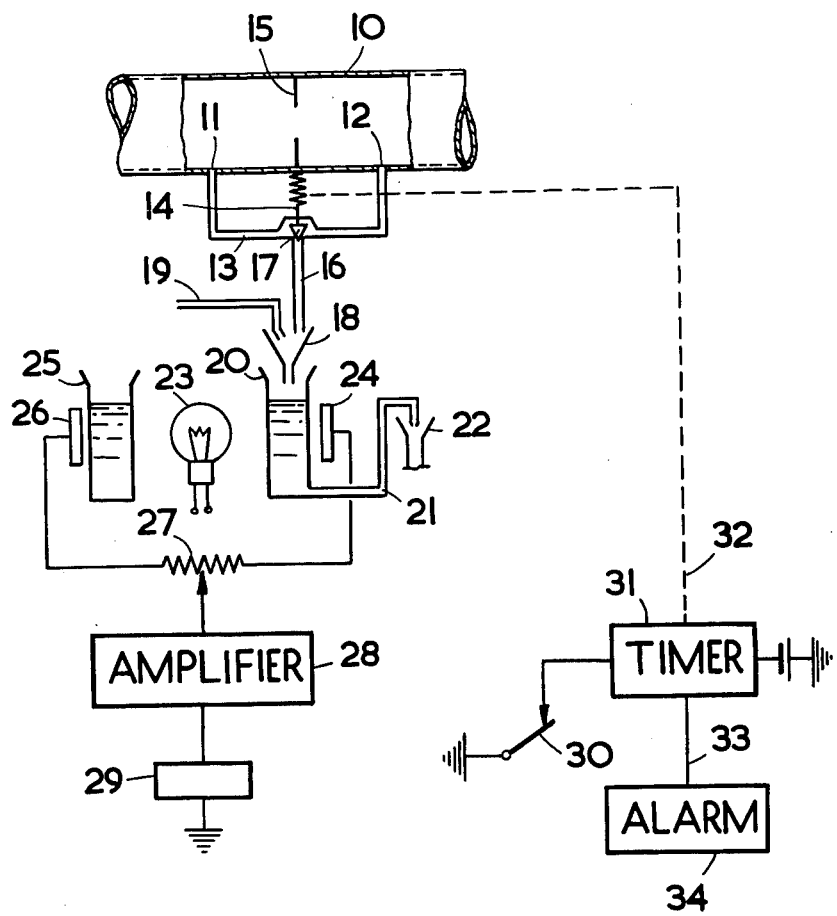

United States Patent Office 3,226,195
Patented Dec. 28, 1965

3,226,195
TESTING FOR THE PRESENCE OR ABSENCE OF A REAGENT IN LIQUORS
John Winfrith de Lisle Nichols, Altrincham, and Colin Ramsay McGowan, Thornhill, Egremont, Cumberland, England, assignors to United Kingdom Atomic Energy Authority, London, England
Filed Aug. 1, 1961, Ser. No. 128,452
Claims priority, application Great Britain, Aug. 2, 1960, 26,808/60
7 Claims. (Cl. 23—230)

This invention relates to methods of testing for the presence or absence of a reagent in liquors, the method being applicable to the control of manufacture of valuable and toxic chemicals, such as plutonium salts. The invention also relates to apparatus for performing such testing.

At one stage in the manufacture of plutonium salts it is essential that the plutonium should be in the tetravalent state so that it can be fully extracted into a solvent. It has been the practice, for this purpose, to reduce mixed quadrivalent and hexavalent plutonium to the trivalent stage by the addition of ferrous sulphamate and then oxidise it to the tetravalent state with sodium nitrite. So long as free sodium nitrite exists it can be accepted that the plutonium is in the tetravalent state and hence a method of testing for the presence of nitrite is required.

Known methods of testing for the presence or absence of a reagent in liquors involve withdrawing samples of the liquor in batches or continuously and testing them with an indicating reagent (for sodium nitrite, starch iodide colorimetric reagent may be used). However such testing involves the withdrawal of substantial quantities of liquors which either have to go to waste, or to storage (in the case of dangerous materials like plutonium) or to reprocessing to recover the valuable component of the liquors.

The present invention provides a method of testing for the presence or absence of a reagent in liquors, the method showing great economy in the use of the liquors.

The method of the present invention comprises the steps of intermittently withdrawing a small, fixed quantity of liquor to be tested and mixing it with a continuously flowing test reagent, the length of the interval between withdrawals of liquor being controlled by the intensity of the reaction between the test reagent and the last quantity of liquor withdrawn in such a way that the more intense the reaction the longer the interval before the next quantity of liquor is withdrawn.

The intensity of the reaction between the test reagent and the withdrawn liquor is dependent on the concentration of the liquor of the reagent being tested for.

A semi-quantitative measurement of the concentration of the reagent being tested for in the withdrawn liquor can be made by observation of the interval between withdrawals. Where there is a possibility that the reagent in the withdrawn liquor may cease to exist and a warning of this condition is required, an alarm (low-level alarm) can be made to operate when the interval between withdrawals is less than a predetermined limit. Similarly a "high level" alarm can be provided if excess reagent in the withdrawn liquors is to be indicated.

Apparatus according to the invention comprises a testing chamber having two inputs and an output, one input serving as an entry for a continuous flow of a test reagent and the other as an entry at intervals for a small fixed quantity of liquor to be tested, a controller for controlling the interval between entries of said small fixed quantities, a reaction detector for detecting the intensity of reaction in the testing chamber, a connection for the reaction detector to the controller so that the controller can be operated to decrease the interval between entries of said small fixed quantities as the reaction intensity diminishes, and an alarm for indicating when the interval is abnormal.

The controller is preferably a valve opened and closed intermittently according to the demands of the detector.

An embodiment of the invention will now be described by way of example with reference to the single figure of the accompanying drawing which is a diagram.

A duct 10 confines a flow of plutonium nitrate solution. The duct has an exit sampling point 11 and return sampling point 12. Between the points 11 and 12 and external to the duct 10 a pipe 13 having an electromagnetic valve 14 is provided and between the points 11 and 12 and internal to the duct 10 a restrictor 15 is provided so that plutonium nitrate solution is caused to flow continuously through the pipe 13. The valve has an outlet connection 16 which is opened and closed under control of a valve member 17. The connection 16 feeds to a tundish 18 the walls of which are continuously flushed by a test reagent flowing along a pipe 19. The tundish 18 discharges into a transparent test cell 20 having an overflow connection 21 feeding to a waste tundish 22. The test cell 20 has on one side of it a lamp 23 and on the other side a photocell 24. A standardised cell 25 is provided on the other side of the lamp 23 together with a photocell 26. The output from the photocells 24, 26 are fed in opposition to one another through a zero setting resistor 27. The output from the resistor 27 is fed to an amplifier 28 and thence to a relay 29. The relay 29 has a contact 30 which is closed when the relay is not operated. The contact 30 completes a circuit to a timer 31 which has one connection 32 to the electromagnetic valve 14 and another connection 33 to an aural and visual alarm 34.

The operation of the apparatus described above is now described.

With the transparency of cells 20 and 25 equal there is zero input to the amplifier 28 and hence relay 29 is not operated and hence the timer 31 is energised through contact 30. The timer 31 causes a pulse of current to pass along the connection 32 which operates the valve 14 thus allowing a drop of the liquor flowing in pipe 13 to discharge into the tundish 18 where it is mixed with test reagent from pipe 19 and supplied to the test cell 20. If the required conditions exist in the drop of liquor (e.g. excess nitrite exists in a plutonium nitrate liquor) the liquid in the test cell 20 will become intensely coloured and will transmit only a fraction of the incident light. This will cause a reduced signal from the photocell 24 and hence an input to the amplifier 28 which causes the relay 29 to operate. Contact 30 is held open and hence the timer is de-energised. As test reagent continues to flow into the test cell 20 so the opacity of the cell contents is reduced until relay 29 ceases to be held operated. At this point contact 30 closes again and the cycle of events is repeated. It will be seen that if the reagent concentration in the liquor is high it will take a longer time for the test cell to lose its opacity than if the reagent concentration is low. Thus the valve 14 will be operated at longer intervals when the reagent concentration is higher than when the reagent concentration is low. If the required conditions (i.e. presence of a particular reagent) are absent or the valve 14 fails to open the timer 31 will be continuously energised. This condition is notified by the alarm 34. If the valve 14 sticks in the open position the contact 30 will not close and again this condition can be notified by the alarm 34.

The apparatus uses only a very small amount of liquor from the pipe 13. Typically only 90 cc. of liquor is drawn from the pipe 13 each day. The apparatus may be calibrated to indicate approximately the quantity of nitrite present in the plutonium nitrate solution.

We claim:

1. A method of determining the presence of a substance in a fluid comprising the steps of withdrawing a small quantity of fluid from a larger quantity of said fluid, mixing said small quantity of fluid with a continuously flowing testing fluid containing a test reagent reactable with said substance to cause a detectable chemical reaction, detecting said chemical reaction, repeating the foregoing sequence of steps of withdrawing, mixing, and detecting at time intervals, regulating the duration of said time intervals by the intensity of said detectable chemical reaction, said time intervals being longer for more intense reactions.

2. A method of determining the presence of a substance in a fluid comprising the steps of withdrawing a small quantity of fluid, mixing said small quantity of fluid with a continuously flowing testing fluid containing a test reagent reactable with said substance to cause visible color change, detecting the intensity of said color change by photocell means, and repeating the foregoing sequence of steps of withdrawing, mixing and detecting at time intervals, and regulating the duration of said time intervals by the intensity of said color change, said time intervals being longer for more intense color changes.

3. A method according to claim 2 wherein said substance is nitrite ion and said test reagent is starch iodide.

4. Apparatus for determining the presence of a substance in a fluid comprising container means to contain a fluid to be tested and having a sampling port having a controlled valve for withdrawal of a small quantity of a fluid from said container means, a testing chamber having inlet means and outlet means, test reagent fluid supply means for continuously conducting test reagent fluid into said testing chamber through said inlet means, conduit means for conducting said small quantities of a fluid from said container means into said testing chamber whereby said small quantity of fluid is caused to mix with said test reagent fluid and cause a detectable chemical reaction between said test reagent fluid and a substance in said small quantity of fluid, detection means responsive to the intensity of a chemical reaction in the testing chamber, and control means linking said detection means to the valve in said coupling port whereby the valve is intermittently opened to withdraw small quantities of fluid from said container means at intervals dependent on the intensity of said chemical reaction, said intervals being longer for correspondingly more intense reactions.

5. Apparatus for determining the presence of a substance in a fluid comprising container means to contain a fluid to be tested and having a sampling port having a controlled valve for withdrawal of a small quantity of a fluid from said container means, a translucent testing chamber having inlet means and outlet means, test reagent fluid supply means for continuously conducting test reagent fluid into said testing chamber through said inlet means, conduit means for conducting said small quantities of a fluid from said container means into said testing chamber whereby said small quantity of fluid is caused to mix with said test reagent fluid and cause a visible color change caused by a chemical reaction between said test reagent fluid and a substance in said small quantity of fluid, detection means comprising a light source and a test photocell in operative association with said transparent testing chamber whereby an electrical signal is generated in proportion to the intensity of said color change, amplifying means to amplify said electrical signal and electrical relay means including a timer to control operation of the valve in said sampling port whereby the valve is intermittently opened at intervals dependent on the intensity of said color change, said intervals being longer for correspondingly more intense color changes.

6. Apparatus according to claim 5 wherein said detection means further comprises a standardized color chamber and photocell electrically associated with said test photocell in a null-point resistance circuit.

7. Apparatus according to claim 6 further comprising alarm means for indicating abnormal intervals between valve openings.

References Cited by the Examiner

UNITED STATES PATENTS

| | | | |
|---|---|---|---|
| 2,253,049 | 8/1941 | Riche | 23—230 |
| 2,386,831 | 10/1945 | Wright | 23—230 |
| 2,977,199 | 3/1961 | Quittner | 23—230 |

MORRIS O. WOLK, *Primary Examiner.*

ANTHONY SCIAMANNA, D. E. GANTZ,
*Assistant Examiners.*